June 20, 1961 C. C. BOOKOUT ET AL 2,988,889
HYDROSTATIC DRIVE
Filed April 28, 1960 2 Sheets-Sheet 1
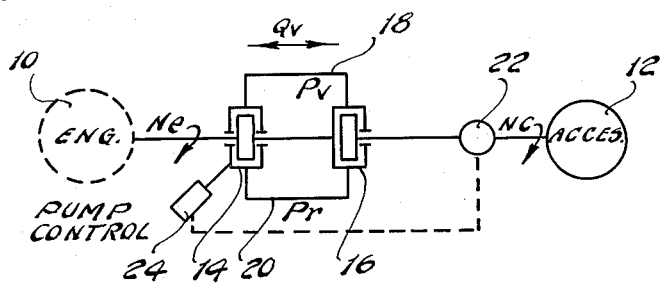
Fig. 1
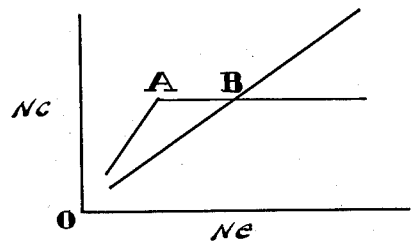
Fig. 2
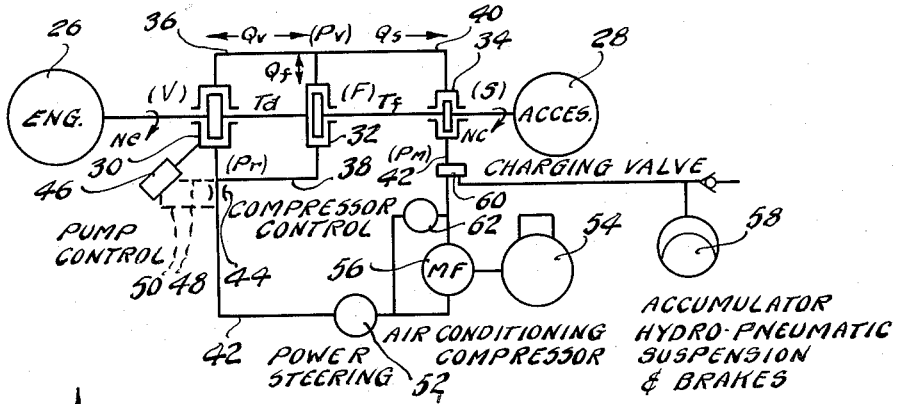
Fig. 3
Fig. 4
INVENTORS.
CHARLES C. BOOKOUT
PAUL E. TAYLOR
SVEN W. SATTAVARA
BY
ATTORNEYS

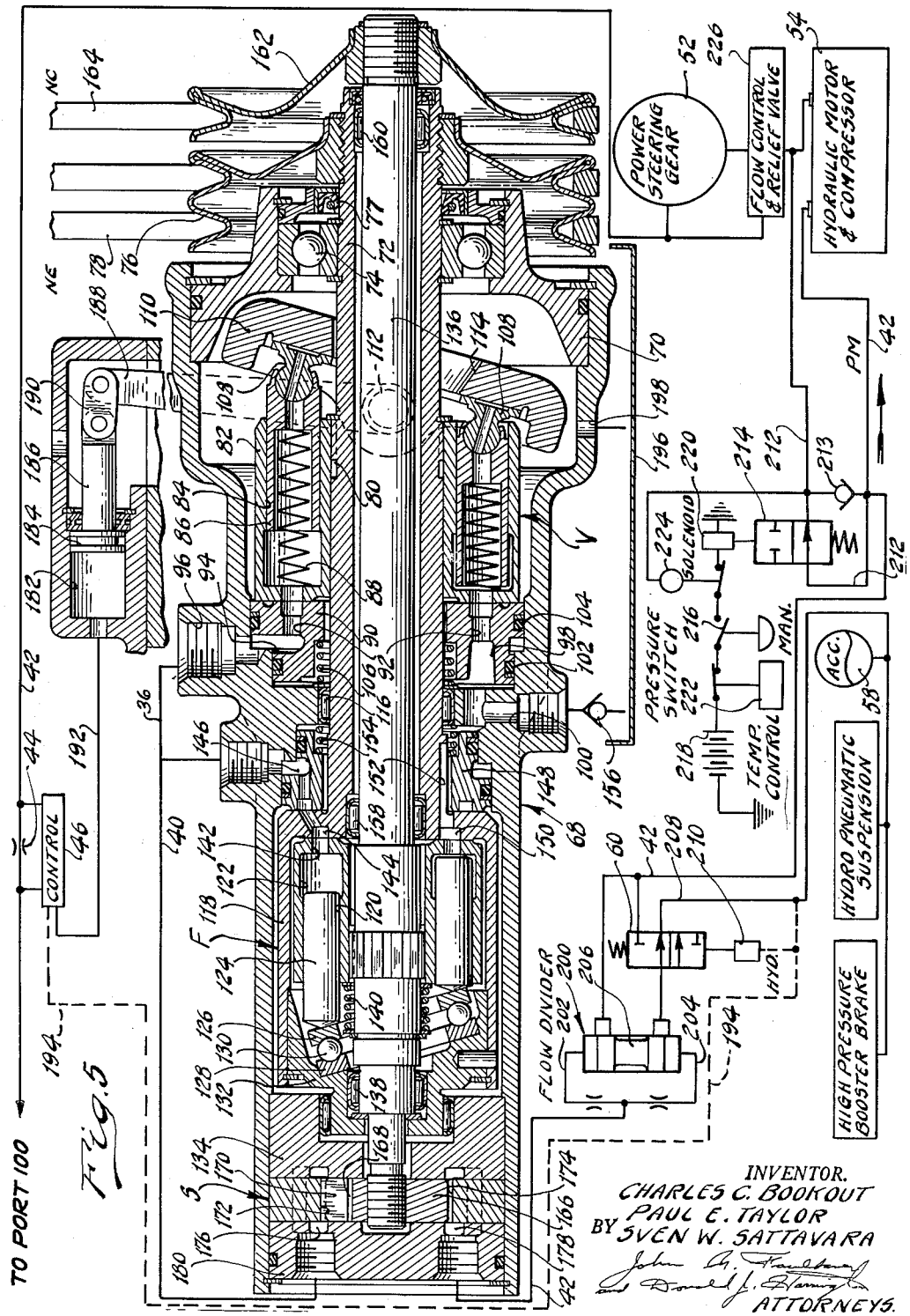

2,988,889
HYDROSTATIC DRIVE

Charles C. Bookout, Livonia, Sven W. Sattavara, Detroit, and Paul E. Taylor, Livonia, Mich., assignors to Ford Motor Company, Dearborn, Mich., a corporation of Delaware
Filed Apr. 28, 1960, Ser. No. 25,275
15 Claims. (Cl. 60—53)

Our invention relates generally to hydrostatic power transmission mechanisms, and more particularly to a constant speed drive employing hydrostatic pump and motor units in a closed hydraulic circuit.

Our improved mechanism is particularly adapted for use in an automotive vehicle for transferring driving power from the vehicle engine to vehicle engine driven accessories. Notwithstanding this, we anticipate that the improvement of our invention may also be applied to other forms of hydrostatic power transmission mechanisms.

In certain hydrostatic drives of known construction a first variable displacement hydraulic unit is disposed in a common, closed hydraulic circuit with a second hydraulic unit. The load shaft is drivably coupled to the second hydraulic unit and the first hydraulic unit is drivably coupled to the engine. Means are provided for varying the displacement of the first hydraulic unit so that the driven speed of the second hydraulic unit can be regulated. The second hydraulic unit is a differentially driven unit that may be of the fixed displacement type, although in some installations it is advantageous to employ a variable displacement second unit as well as a variable displacement first unit and to provide a controlling mechanism for coordinating the displacement varying means for both units in response to variations in the magnitude of a given operating variable.

In accessory drives for automotive vehicles, a relatively constant accessory speed is desirable since this will permit the accessories to function at their optimum drive speeds. The range of operating speeds for automotive engines is relatively great and the accessory drive must therefore be capable of accommodating a wide variation in input speeds while maintaining a constant output or accessory speed. The most critical operating condition exists when the engine is idling or is operating under high load at low speeds. The load requirements under such conditions are often at a maximum although the driving speed of the power input member for the accessory drive is at a minimum.

In a preferred embodiment of our invention, the driven speed of the accessories is sensed by means of a controller drivably connected to the power output shaft of the accessory drive. The controller comprises a third hydraulic unit and the rate of fluid flow passing through the third unit is utilized as a signal for adjustably controlling a displacement varying mechanism for the first hydraulic unit. This signal is obtained by means of a precalibrated orifice situated at the discharge side of the third hydraulic unit, the pressure drop across the orifice being an indication of the rate of flow through the third unit.

During operation of the accessory drive at lower speeds, the displacement of the first hydraulic unit is maintained at a maximum value and the second hydraulic unit is driven at an overdrive speed ratio. When the accessory speed reaches a value in excess of a desired limiting value, the displacement controlling mechanism for the first hydraulic unit reduces the displacement of the first hydraulic unit and the speed ratio is accordingly reduced.

When the engine speed increases still further, the product of the displacement and the speed of the first hydraulic unit and the product of the displacement and the differential speed of the second hydraulic unit both approach zero. When the former product is zero, the first hydraulic unit ceases to function as a pump and it begins to function as a motor. When the latter product is zero, the second hydraulic unit ceases to function as a motor and it begins to function as a pump. In a conventional hydraulic circuit, both units undergo this transition at the same instant.

In our improved circuit, a driving ratio of unity between the engine and the engine driven accessories will exist when the first and second units are both functioning as pumps and when one half of the flow requirement of the third unit is supplied by the first unit and the other half is supplied by the second unit. Further increases in engine speed will result in an adjustment of the displacement of the first hydraulic unit to an over-center position, the first hydraulic unit thereafter functioning as a motor and the second hydraulic unit thereafter functioning as a pump. The differential action of the second hydraulic unit will then regeneratively transfer driving power through the hydraulic circuit to the variable displacement first unit so that the total power transferred from the engine to the accessories remains constant.

A principal feature of our improved hydrostatic system resides in the provision of a third hydraulic unit which can function both as a displacement controlling unit and as a source of pressure for powering a fluid motor that in turn drives the accessories. The third hydraulic unit can be used for driving the load in this fashion in lieu of driving the load directly by means of a mechanical connection with the second hydraulic unit. This arrangement provides greater flexibility in locating the various engine driven accessories, and it eliminates the need for locating certain accessories within the engine compartment of the vehicle. The provision of an accessory drive mechanism having this characteristic is therefore one of the objects of our invention.

It is a further object of our invention to provide a hydraulic drive of the type above described wherein the third unit is combined hydraulically and mechanically with the other two hydraulic units in such a way that the third unit will function as a signal unit for the variable displacement first unit as well as a pressure source for the fluid motor that drives the engine driven accessories.

It is a further object of our invention to provide an improved circuit of the type above described wherein the third hydraulic unit will function as a motor means for supplying all or a portion of the torque requirements of the accessories when these requirements are less than a predetermined design value, and which will function as a hydraulic pump for intensifying the hydraulic circuit pressure when the pressure requirements of the accessories increases to a range of values greater than a predetermined design value.

It is a further object of our invention to provide a hydraulic circuit of the type above set forth wherein the operating pressure differential which exists across the hydraulic units is of a reduced order of magnitude. This characteristic makes it possible to simplify the design of the hydraulic units thereby allowing a substantial reduction in the cost of the units.

Another object of our invention resides in the provision of a circuit of the type above described wherein the hydraulic units are situated in a closed hydraulic circuit and wherein the third hydraulic unit will function automatically to intensify the pressure in the closed circuit in response to changes in the operating pressure requirements of the accessories. We contemplate that this circuit pressure intensification may be accomplished without the need for providing an auxiliary controller for the third hydraulic unit.

It is another object of our invention to provide a mechanism comprising three hydraulic units as above described, wherein the units are compactly arranged in a common housing requiring a minimum amount of space.

It is a further object of our invention to provide a hydrostatic drive of the type set forth which is characterized by a relatively high degree of efficiency and which is capable of transferring power from an engine to various engine driven accessories without undesirable power dissipation in the circuit.

For the purpose of more particularly describing a preferred embodiment of our invention, reference will be made to the accompanying drawings wherein:

FIGURE 1 is a schematic circuit drawing of a hydrostatic accessory drive having a third hydraulic unit for providing an accessory speed signal;

FIGURE 2 is a graphic representation of the relationship between the accessory speed and engine speed for an accessory drive of the type illustrated in FIGURE 1;

FIGURE 3 shows in schematic form the improved circuit of our instant invention. This circuit embodies a third hydraulic unit which functions as a source for an accessory speed signal and as a fluid pump for driving certain vehicle accessories;

FIGURE 4 is a graphic representation of the performance characteristics of the hydraulic circuit of FIGURE 3; and, FIGURE 5 shows a longitudinal cross sectional view of a preferred embodiment of the hydrostatic mechanism of our instant invention together with a schematic illustration of other portions of the fluid circuit.

Referring first to the schematic circuit drawing of FIGURE 1, we have illustrated a hydrostatic accessory drive for transmitting driving torque from a vehicle engine 10 to engine driven accessories 12. The hydrostatic drive which forms the power delivery path between engine 10 and accessories 12 comprises a variable displacement pump 14 and a differentially driven, fixed displacement pump 16 which are situated within a closed hydraulic circuit. The rotor for pump 14 is drivably coupled to the engine and is driven with a speed represented by the symbol $N_e$. The rotor for pump 14 is also mechanically coupled to the rotatable pump housing for the differential hydraulic unit 16 so that the rotor for pump 14 and the housing for pump 16 rotate at engine speed $N_e$. The pumps 14 and 16 are hydraulically connected to each other by means of a closed hydraulic circuit comprised in part by passages 18 and 20.

A third hydraulic unit is shown at 22 and it is drivably coupled to the accessory drive shaft. Unit 22 functions as a fluid pressure governor pump which is responsive to the driven speed of the accessories. The pressure signal made available by pump 22 is distributed to a pump displacement controlling mechanism or controller shown at 24. The controller 24 responds to the pressure signal made available by pump 22 to appropriately vary the displacement of the unit 14.

During operation of the hydrostatic drive arrangement shown in FIGURE 1 at relatively low engine speeds, the unit 14 initially assumes a maximum displacement. The engine is therefore effective to power the rotor for unit 14 and to simultaneously deliver driving torque directly to unit 16. The displaced fluid from unit 14 is transferred through passage 18 to unit 16, thereby supplementing the torque transferred directly to unit 16 by the engine through the mechanical flow path above described. The fluid displaced by unit 16 is then returned to unit 14 through return passage 20. It is apparent that whenever the ratio of the displacement of unit 14 to the fixed displacement of unit 16 is greater than the ratio of the differential speed of unit 16 to the speed of unit 14, the unit 16 will be driven with an overdriving speed ratio so that the driven speed of the accessories will be greater than the engine speed. Stated in another way, the ratio of $N_c$ to $N_e$ will then be greater than unit.

When the displacement of hydraulic unit 14 is maintained at its maximum value, the accessory speed will continue to increase as the engine speed increases in direct relationship.

Referring next to FIGURE 2, we have shown the speed relationship between the accessory drive shaft and the engine driven power input shaft. The aforementioned direct driving relationship between the accessories and the engine is represented in FIGURE 2 by the line O—A. In one embodiment of our invention the point A corresponds to an engine speed of approximately 1000 r.p.m., and the accessory speed corresponding to the engine speed will be approximately 2000 r.p.m. by reason of the overdriving speed ratio previously described.

The accessory speed of 2000 r.p.m. that is obtained in the preferred embodiment above described corresponds to the optimum design speed for the accessories, and once this speed has been obtained it becomes desirable to maintain the same at a constant value during further engine speed changes. This is done by decreasing the displacement of the hydraulic unit 14. This results in a decrease in the relative speed ratio of hydraulic units 16 and 14. When the product of the displacement and the speed of the unit 14 becomes equal to the product of the displacement and the differential speed of unit 16, the speed ratio between units 14 and 16 will be equal to unity. This point is represented on the chart of FIGURE 2 by the letter B. If the speed of the engine increases still further, it becomes necessary to further decrease the displacement of hydraulic unit 14 in order to maintain the accessory speed at the constant speed setting. This results in a reversal of the fluid flow between hydraulic units 14 and 16. This flow is represented in FIGURE 1 by a vector identified by symbol $Q_v$, and since this flow can be reversed, as above described, the flow vector which is used to represent the same is bi-directional.

When the hydrostatic drive is operating in the range designated by letters O—A or in the range between points A and B, the hydraulic unit 14 functions as a fluid pump and the hydraulic unit 16 functions as a fluid motor. However, when the speed of the accessories becomes equal to the speed of the engine and when a reversal in the direction of the flow begins to take place, the unit 16 begins to function as a pump and the unit 14 begins to function as a fluid motor. At engine speeds greater than the speed corresponding to the letter B in FIGURE 2, the unit 16 will return power to the power input shaft for unit 14 and there is no undesirable dissipation of the excess power which is made available by the engine. The over-all operating efficiency is thereby maintained at a high value.

It is because of this functional relationship between the hydraulic units that our improved system may be described as a regenerative system with a pair of power delivery paths, one of the paths being a hydraulic path and the other being a mechanical path. The portion of the power being delivered through one path will complement the portion of the power being delivered through the other path so that the total amount of power being delivered from the engine to the accessories will be equal to only that which is required by the accessories. All of the power made available by the engine which is not required to drive the accessories is returned to the engine.

In certain automotive applications to which our hydrostatic drive can be adapted, the accessories may include an engine driven generator, a cooling fan, a water pump for circulating coolant through the engine block and radiator, a power steering pump and an air conditioning compressor and motor. In addition to the foregoing, the automotive accessories may include a high pressure booster brake and a hydro-pneumatic vehicle suspension system with a hydraulic accumulator.

Due to space limitations it becomes very difficult to locate these numerous accessories within the engine compartment. We have overcome this space problem by providing an arrangement in which certain of the accessories, such as the air conditioning compressor, can be powered by means of a hydraulic motor. This will permit the location of the air conditioning compressor at a remote location and it is then only necessary to provide a hydraulic connection between the hydraulic motor and the portion of the system in which the compressor and accumulator are located.

Referring next to FIGURE 3, we have illustrated in schematic form the improved circuit of our instant invention. This circuit utilizes a third hydraulic unit as a speed sensor and as a source of pressure for a fluid motor used for driving certain of the vehicle accessories. This is in contrast to the arrangement shown in FIGURE 1, wherein the third hydraulic unit is used merely as a speed sensor and wherein the accessories are mechanically coupled to the second hydraulic unit 16.

In the circuit of FIGURE 3, the engine is represented by numeral 26 and certain of the accessories, such as the coolant pump and the fan, are represented by numeral 28. A first hydraulic unit is shown at 30 and this may be of the variable displacement type as previously indicated. A differentially driven second hydraulic unit, which may be of fixed displacement, is shown at 32. A third fixed displacement hydraulic unit, which may be of the vane type, is shown at 34. The rotor for unit 30 is positively coupled to the engine and is driven at engine speed $N_e$. The rotor for unit 30 is also mechanically coupled to the rotary housing for unit 32 as suggested by the circuit of FIGURE 1. The rotor for unit 32 is connected to the rotor for unit 34 which in turn is positively coupled to the accessories 28. The unit 30 and the unit 32 are coupled together hydraulically by a passage structure that includes passages 36 and 38. Similarly, the hydraulic unit 32 is hydraulically connected to unit 34 through passage structure shown in part at 40 and 42. The hydraulic units 30, 32 and 34 are therefore situated within a closed hydraulic circuit, and they are coupled together both hydraulically and mechanically.

The hydraulic units 30 and 32 function in a manner that is similar to the mode of operation of units 14 and 16 referred to in the description of the circuit of FIGURE 1. During the initial operation of the hydraulic drive at low engine speeds, the displacement of hydraulic unit 30 is at a maximum value and the rotor of hydraulic unit 32 is therefore overdriven with a speed ratio greater than unity. The chart of FIGURE 2 can also be used to represent the performance characteristics of the circuit of FIGURE 3, and when the speed of the accessories 28 reaches a value corresponding to the point A, the displacement of hydraulic unit 30 is progressively reduced so that the accessory speed will be maintained at a relatively constant value as the engine speed increases still further. The speed relationship of the engine and the accessories will then be represented by the horizontal line A—B in FIGURE 2, and when point B is reached the speed ratio between the engine and the accessories 28 becomes unity. If the engine speed increases still further beyond point B, a reversal in the flow takes place and unit 30 thereafter functions as a motor while unit 32 functions as a pump. The fluid discharged from the unit 34 is distributed through passage 42 to the return side of hydraulic unit 30, and the magnitude of the flow through this passage 42 can be sensed by means of a precalibrated orifice 44. The pressure drop across the orifice is transmitted to a controlling mechanism 46 through passages 48 and 50 situated on opposite sides of the orifice 44.

A power steering unit is designated in FIGURE 3 by numeral 52 and an air conditioning compressor is shown at 54. The compressor 54 is driven by a fluid motor 56.

The accumulator for a hydro-pneumatic suspension and brake system is shown at 58, and the pressure distributed to the accumulator 58 is controlled by a charging valve 60, which will be subsequently explained.

A compressor control is shown at 62 and it functions to regulate the distribution of fluid pressure to motor 56 in a manner which will become apparent from a description of the circuit of FIGURE 5. The hydraulic unit 34 functions as a power steering pump for pressurizing the power steering unit 52.

It will be shown in the subsequent description that the hydraulic unit 34 will be capable of supplementing the pumping action of hydraulic units 30 and 32, and it may therefore be considered to be a supplementary source of pressure or a circuit pressure intensifier. The hydraulic unit 34 also functions as a signal unit for the variable displacement unit 30, as previously explained. Thirdly, the hydraulic unit 34 functions as a power steering pump.

It will also become apparent from the subsequent description that the unit 34 is capable of functioning either as a pump or as a motor depending upon the pressure requirements of the various accessories.

The functional relationship between the hydraulic units 30, 32 and 34 in the circuit of FIGURE 3 can best be explained analytically, and for this purpose the variable displacement unit 30 will hereinafter be represented by the symbol V. Further, the fixed displacement, differentially driven unit 32 will hereinafter be referred to by the symbol F and the hydraulic unit 34 will hereinafter be designated by the letter S. The flow of fluid in passage 36 will be represented by the symbol $Q_v$ and the flow of fluid into hydraulic unit F will be referred to by the symbol $Q_f$. Similarly, symbol $Q_s$ is used to designate the flow of fluid through passage 40 leading to the hydraulic unit S. It will be apparent that the quantity $Q_s$ will be equal to the algebraic sum of the quantities $Q_v$ and $Q_f$. The pressure in passages 36 and 40 will be represented by the symbol $P_v$ and the pressure on the outlet side of the hydraulic unit S will be represented by the symbol $P_m$. The pressure on the downstream side of the fluid motor for the air conditioning compressor and accumulator circuit is represented by symbol $P_r$ which is the supercharge pressure. The torque delivered directly from the engine to the rotary housing for hydraulic unit F is represented by the symbol $T_d$ and the torque delivered through the mechanical portion of the power flow path between hydraulic units F and S is represented by the symbol $T_f$.

Having thus established an appropriate nomenclature, the power relationships for each of the three hydraulic units, V, F and S, can be represented as follows:

For hydraulic unit V, the power input equals $2\pi K T_e N_e$, where $T_e$ is the engine torque, and the power output can be represented by the quantity $2\pi K T_d N_e + K Q_v \Delta P_v$.

In a similar fashion, the power delivered to hydraulic unit F can be represented by the quantity $2\pi K T_d N_e + K Q_f \Delta P_f$ and the power delivered from hydraulic unit F can be represented by the quantity $2\pi K T_f N_e$ when $N_e$ is the accessory speed.

For unit S, the power input is equal to the quantity $2\pi T K_f N_c + K Q_s \Delta P_s$ and the power output equals $2\pi K T_c N_c$.

In the above relationships, $\Delta P_f$ equals $P_v - P_r$; $\Delta P_s$ equals $P_v - P_m$ and $\Delta P_m$ equals $P_m - P_r$. Also, the quantity K is a known circuit constant.

Since the power delivered to hydraulic unit S equals the power delivered from hydraulic unit S, the following power relationship can be established:

(1)      Power Input=Power Output (2)      $2\pi K T_f N_c + K Q_s \Delta P_s = 2\pi K T_c N_c$ (3)      $\Delta P_s = \dfrac{2\pi N_c (T_c - T_f)}{Q_s} = \dfrac{2\pi N_c}{D_s N_c}\left(T_c - \dfrac{D_t P_t}{2\pi}\right)$ (4)      $\Delta P_s = P_v - P_m = \dfrac{2\pi}{D_s}\left(T_c - \dfrac{D_t (P_v - P_r)}{2\pi}\right)$ (5) $$P_v = \frac{2\pi T_c}{D_s} - \frac{D_f P_v}{D_s} + \frac{D_f P_r}{D_s} + P_m$$

(6) $$P_v = \frac{2\pi T_c - D_f + P_r}{D_s} + P_m$$

(7) $$P_v\left(1 + \frac{D_f}{D_s}\right) = \frac{2\pi T_c + D_f P_r}{D_s} + P_m$$

(8) $$P_v\left(\frac{D_s + D_f}{D_s}\right) = \frac{2\pi T_c + D_f P_r + D_s P_m}{D_s}$$

(9) $$P_v = \frac{2\pi T_c + D_f P_r + D_s P_m}{D_s + D_f}$$

Referring next to FIGURE 4, we have illustrated in graphic form the performance characteristic of the hydraulic circuit of FIGURE 3. More specifically, FIGURE 4 shows the relationship between $P_m$ and $P_v$ with reference to the above expression for $P_v$. If $P_m$ is equal to zero, the value for $P_v$ can be represented as the sum of the quantity $$\frac{D_f \times P_r}{D_s + D_f} + \frac{2T_c}{D_s + D_f}$$

In the above analysis the quantity $P_r$ is a supercharge pressure which may be made available by a separate supercharge pump. If a supercharge pressure is available, the functional relationship between the quantities $P_m$ and $P_v$ is represented by the line 64. On the other hand, if a supercharge pressure is not available, the relationship between $P_m$ and $P_v$ is represented by the line 66. In most instances, however, it is desirable to have a supercharge pressure so that compensation can be made for the leakage of the various hydraulic units. The hydraulic units are thereby maintained full of oil at all times. For purposes of further discussion, reference will be made only to the line 64.

Since the displacements of hydraulic unit S and the hydraulic unit F are constant, the slope of line 64 is constant as indicated in FIGURE 4. If it is now assumed that the load of the accessories is such that the value of $P_m$ is less than that value corresponding to point P on the line 64, the value for $P_v$ which will be obtained will be greater than $P_m$. The unit S will therefore function as a motor. If, however, the value of $P_m$ is greater than the value corresponding to point P, the value of $P_v$ which accompanies that value of $P_m$ will be greater than $P_m$, and the hydraulic unit S will function as a pump. In this capacity, unit S serves to intensify the circuit pressure which is made available by the other hydraulic units. The actual pressure differential which then exists across unit S is not of a high order of magnitude, even though the total load requirements of the accessories is relatively high.

If the supercharge pressure is varied, the location of point P in FIGURE 4 will be varied accordingly. The locus of point P will correspond to a 45 degree line originating at the origin of the chart of FIGURE 4.

It is apparent from the foregoing that the unit S functions automatically to either increase or decrease the circuit pressure in order to accommodate changing hydraulic load demands. This automatic regulation takes place without an undesirable dissipation of power.

Referring next to FIGURE 5, we have shown in cross section a complete working assembly that includes pump or motor units V, F and S. The assembly of these units V, F and S is housed within a common housing 68 in axial alignment as indicated.

Housing 68 is formed with two end openings, one of which has secured therein a bearing retainer 70. A driving shaft 72 is rotatably journaled within housing 68 by means of bearings 74 retained by bearing retainer 70.

Shaft 72 extends outwardly and a sheave 76 is secured thereto, as indicated. A suitable seal 77 may be disposed between bearing retainer 70 and shaft 72. The sheave 76 accommodates engine driven belts 78 which form a driving connection between the engine crankshaft and the sheave 76.

The shaft 72 is keyed or splined at 80 to a pump rotor 82 for the variable displacement pump V. The rotor 82 is formed with a plurality of axially disposed pumping chambers 84, and a movable piston 86 is situated within each pumping chamber 84. The pistons 86 are biased in a right-hand direction as viewed in FIGURE 5 by springs 88.

The rotor 82 is situated in sliding engagement with adaptor plate 90 which is apertured as shown at 92 to provide communication between the pumping chambers 84 and a port 94. The port 94 communicates with a threaded port 96, the latter accommodating a fluid fitting.

The apertures 92 also communicate with a port 98 formed in the adaptor plate 90, and the port 98 is in turn in communication with a port 100 formed in housing 68. The ports 94 and 98 are separated from each other by means of fluid seals 102 and 104. The adaptor plate 90 is spring urged into sliding engagement with the pump rotor 82 by means of a spring 106.

The pumping elements 86 carry shoes or slippers 108 on the extended ends thereof, and these shoes are adapted to tilt with respect to the pumping elements 86, a ball and socket type connection therebetween being provided for this purpose. The shoes 108 slidably engage a swash plate 110, and they are internally ported to provide fluid communication between the chambers 84 and the contact region between the shoes 108 and the surface of the swash plate 110.

The swash plate 110 is pivoted for oscillation about a transverse axis and it is provided with pivot shafts 112 for this purpose. Shafts 112 may be journaled within cooperating bearing apertures formed in the stationary housing 68.

The swash plate 110 is formed with a central opening 114 through which a shaft 72 extends. The diameter of shaft 72 is substantially smaller than the minimum diameter of opening 114 so that a limited degree of oscillation of swash plate 110 about the axis of pivot shafts 112 may take place without interference between swash plate 110 and the shaft 72.

It will be apparent from the foregoing that when the swash plate 110 is positioned on an angle, as illustrated in FIGURE 5, the pumping elements 86 will reciprocate within chambers 84 when the roto 82 is driven about the axis of shaft 72. In FIGURE 5, one of the pumping elements 86 is shown in the fully retracted position and another pumping element 86 is shown in the fully stroked position. The port 94 is situated so that the chambers 84 will communicate therewith when the cooperating pumping elements are in a retracted position, and the port 98 communicates with the chambers 84 when the pumping elements 86 assume a stroked position. The port 98 and the port 94 can therefore be referred to as an intake port and an outlet port respectively.

The shaft 72 is journaled within housing 86 by a needle bearing assembly 116. The shaft 72 is formed integrally with a rotary housing 118 for the hydraulic unit F. The housing 118 is properly of cylindrical form as shown in FIGURE 5. A fluid rotor 120 is situated within housing 118 and it is formed with pumping chambers 122. Each of the chambers 122 has reciprocally mounted therein pumping elements 124 that extend outwardly in an axial direction so that they contact a bearing race 126. This bearing race 126 forms a part of a thrust bearing assembly that also includes a race 128 and thrust balls 130 situated between races 128 and 126. The race 128 is seated on a bearing adaptor 132 secured in the open end of housing 118. Adaptor 132 includes an extension which is piloted within a cooperating opening formed in a closure plate 134 situated adjacent the left end of the housing 68.

The rotor 120 is positively splined or otherwise coupled to a centrally disposed shaft 136 so that when the rotor 120 is driven, power is delivered to the shaft 136. A bearing 138 is disposed between adaptor 132 and shaft 136 for journaling the latter.

The thrust bearing assembly designated by reference characters 126, 128 and 130 is situated on a bias so that when relative motion takes place between the rotor 120 and the rotary pump housing 118, the pumping elements 124 will reciprocate within the pumping chambers 122. The rotor 120 is normally urged in a right-hand direction, as viewed in FIGURE 5, into sliding engagement with the right-hand end of the cavity defined by housing 118, a suitable spring 140 being provided for this purpose.

The rotor 120 is formed with a plurality of passages 142 which are adapted to communicate with an annular groove 144. The groove 144 in turn communicates with a port 146 formed in a pump adaptor 148. The port 146 in turn communicates with passage 40, previously discussed with reference to FIGURE 3. Ports 142 also communicate with an annular groove 150 formed in adaptor 148, and this groove 150 in turn communicates with the aforementioned port 100 through an internal passage designated by reference character 152. The adaptor 148 is normally urged into sliding engagement with the pump housing 118 by a spring 154.

When the individual pumping chambers 122 assume a position which corresponds to a retracted position of the cooperating pumping elements 124, they communicate with port 146. On the other hand, when the chambers 122 are rotated so that the pumping elements 124 assume a stroked position, they communicate with annular groove 150 and the communicating port 100. A pressure relief valve 156 is provided at this point, to limit supercharge pressure to the 50 p.s.i. hereafter described.

The shaft 136 extends through shaft 30 in concentric relationship, and spaced bearings may be provided between these shafts as indicated at 158 and 160. Shaft 136 extends outwardly and is adapted to carry a sheave 162. A driving belt 164 for accessories 28 is trained over sheave 162.

The other end of shaft 136 is drivably coupled to a rotor 166 for hydraulic unit S. This rotor 166 may be formed with radial slots 168 for accommodating pumping vanes 170. These vanes 170 in turn engage camming surfaces 172 and 174. The pumping chambers defined by the plurality of vanes 170 cooperate with the surrounding cam surfaces, and as the rotor 166 is rotated with respect to these cam surfaces, the volume of the pumping chambers progressively increase and decrease thereby establishing a pumping action in a known fashion. An inlet port 176 and an outlet port 178 are formed in a closure member 180, and when hydraulic unit S is in operation fluid flow takes place from port 176 to port 178. Port 176 is in fluid communication with the aforementioned passage 40 and port 178 is in fluid communication with the aforementioned passage 42.

In the cross sectional view of FIGURE 5, the passage 150, the port 100 and the port 98 form a counterpart for passage 36 which was referred to with reference to FIGURE 3.

The mechanism for adjustably positioning swash plate 10 may comprise a servo motor as indicated in FIGURE 5. This servo motor comprises a cylinder 182 secured to housing 68. A piston 184 is reciprocally mounted within cylinder 182 and it is formed with a piston rod 186. An adjusting lever 188 may be mechanically connected to a pivot shaft 112 for the swash plate 110 and it may be coupled to piston rod 186 by a suitable link 190. Actuating pressure is supplied to the swash plate adjusting servo through a passage 192 that communicates with the aforementioned controlling mechanism 46.

The mechanism 46 will respond to pressure the differential across precalibrated orifice 44 to appropriately control the degree of communication between the passage 194 and passage 192, the former communicating with the high pressure region of the circuit. Note that passage 194 communicates with the accumulator 58 which is normally maintained at a relatively high pressure during operation. As previously indicated, the rate of flow through passage 42 and orifice 44 is an indication of the speed of the accessories 28 so that changes in the speed of accessories 28 will be sensed by the controller 46 to appropriately distribute servo actuating pressure to the swash plate actuating servo. In this way the displacement of the pumping unit V can be appropriately controlled to maintain a constant accessory speed as previously explained.

It is apparent from the foregoing that the three hydraulic units, V, F and S, are interconnected both hydraulically and mechanically and they function together in a closed circuit to provide a compact, hydrostatic accessory drive mechanism of maximum efficiency. The drive mechanism is also characterized by low circuit pressures.

Although we have not illustrated a supercharge pump in FIGURE 5, we contemplate that such a pump may be incorporated in the circuit with a minimum of difficulty. According to one operating embodiment of our invention, a supercharge pressure of about 50 p.s.i. is maintained and the supercharge pump is drivably geared to the shaft 72. This pump may be housed within a portion of the housing 68. The intake side of the supercharge pump may communicate with a sump 196 and the discharge side of the supercharge pump may be connected to passage 42.

The sump 196 is also adapted to accommodate leakage from the interior of the hydraulic unit, a suitable drain port 198 being provided for this purpose.

As indicated in FIGURE 5, the passage 42 communicating with the discharge side of hydraulic unit S has situated therein a flow divider valve 200. This valve comprises two branch passages 202 and 204 which communicate with opposite sides of a valve chamber within which is situated a flow divider valve element 206. Valve element 206 controls the distribution of fluid pressure to an accumulator passage 208 and to the portion of passage 42 on the downstream side of the flow divider valve.

Valve 200 diverts a certain degree of the flow in passage 42 to passage 208. Charging valve 60 is situated within passage 208 and it is spring biased in a downward direction as viewed in FIGURE 5. When the valve 60 assumes the position shown, free communication is established between accumulator 58 and the flow divider valve. When the accumulator pressure builds up to the desired operating pressure level, a hydraulic servo valve actuator 210 moves valve 60 against the opposing force of the valve spring to block communication between passage 208 and flow divider valve 200 and to simultaneously establish communication between the flow divider valve branch passage 208 and the downstream portion of passage 42.

Valve 200 includes a flow restricting orifice in each of the branch passages 202 and 204. These orifices are calibrated so that the flow through passage 202 will be substantially greater than the flow through passage 204 when the accumulator is charging. In one preferred embodiment of our invention the total flow through passage 42 is about 6 gallons per minute at 3000 engine r.p.m. The branch passage 202 is adapted to accommodate about 5 gallons per minute of this total flow and the branch passage 204 will accommodate approximately 1 gallon per minute while the accumulator is charging.

During those instances in which the accumulator portion of the circuit is charging, the pressure in that portion of the circuit progressively increases. This tends to change the pressure drop across the orifice for branch passage 204, and unless an appropriate compensation is made, this change in pressure drop will upset the ratio of the rates of flow of fluid through passages 202 and 204.

The valve 200 provides such a compensation since an increase in the pressure in the accumulator portion of the circuit will cause the valve 200 to move upwardly as viewed in FIGURE 5. This decreases the degree of communication between passage 202 and the downstream side of passage 42, and the pressure drop across the orifice in branch passage 202 thereby tends to change to the same extent that the pressure drop across the orifice in branch passage 204 tends to change. Since the pressure drop across each of these two orifices is thereby balanced by the valve 200, the ratio of the rates of flow of fluid through these branch passages is maintained at a constant value.

Passage 42 communicates directly with the intake side of a hydraulic motor for the compressor 54. However, the compressor may be bypassed through a bypass passage 212 during those instances in which the compressor is not operating. A solenoid operated valve 214 is situated in bypass passage 212 and it is spring biased in an upward direction, as indicated. When the valve 214 assumes the position shown, the bypass passage 212 establishes free communication around the compressor motor. To operate the compressor, a manual switch 216 is operated and this closes an electrical circuit that includes battery 218 and valve operating solenoid 220, the latter thereby being energized. This causes valve 214 to move in a downward direction, as viewed in FIGURE 5, thereby blocking bypass passage 212. The entire flow will therefore pass directly through the compressor motor thereby driving the compressor for the air conditioning system.

A second switch is shown at 222. This switch is thermostatically operated so that when the ambient temperature within the passenger compartment of the vehicle reaches a desired value, the switch will open to deactivate the solenoid and cause the valve 214 to move to a bypass position.

The power steering gear is situated in series relationship with respect to the compressor, and the pressure requirements of the power steering gear and of the compressor motor are accordingly additive. If the system pressure requirements which are dictated by the power steering gear and the compressor motor exceed a predetermined operating level, a pressure switch 224 will be actuated thereby interrupting the solenoid 220 to again cause the valve 214 to assume a bypass position. The bypass flow through passage 42 will therefore be directed into the power steering gear. In this way priority is given to the power steering gear for safety purposes in the event that the capacity of the circuit is not capable of accommodating the requirements of both the power steering gear and the compressor. An overpressure relief valve is shown at 213.

During normal operation the flow requirements of the compressor motor are greater than the flow requirements of the power steering gear. For this reason a flow control valve 226 is situated in the circuit between the power steering gear and the compressor motor in order to effect a desired distribution of flow to the steering gear. Any flow in passage 42 which is in excess of the designed value for the power steering gear will be bypassed around the power steering gear by the flow control valve 246.

Having thus described a preferred embodiment of our invention, what we claim and desire to secure by United States Letters Patent is:

1. A hydrostatic transmission comprising a first hydrostatic unit, a second hydraulic unit, means for varying the displacement of one of said hydrostatic units, a third hydrostatic unit, a source of driving power, said power source being mechanically connected to said first and second hydrostatic units, said third hydrostatic unit being mechanically coupled to said second hydrostatic unit, said first and second hydrostatic units being disposed in a primary closed hydraulic circuit, said third hydrostatic unit being disposed in and partly defining a secondary hydraulic circuit, and a hydraulic motor in said secondary hydraulic circuit drivably connected to a load, said displacement varying means being sensitive to the rate of fluid flow in said secondary hydraulic circuit.

2. A hydrostatic transmission for delivering power from an engine to an engine driven load, a first hydraulic unit drivably connected to said engine, a second hydraulic unit comprising a pair of cooperating fluid pumping members, a third hydraulic unit, one of said pumping members being mechanically connected to said first hydraulic unit and driven thereby, the other of said pumping members being mechanically connected to said third hydraulic unit, a closed primary hydraulic circuit interconnecting said first and second hydraulic units whereby one unit functions as a motor and the other acts as a pump, and a secondary circuit connecting said third hydraulic unit to said first and second hydraulic units in parallel relationship, said secondary circuit including a fluid motor means for driving said load.

3. A hydrostatic transmission comprising a first hydraulic unit, a second hydraulic unit, means for varying the displacement of one of said hydraulic units, a third hydraulic unit, a source of driving power, said power source being mechanically connected to said first and second hydraulic units, said third hydraulic unit being mechanically coupled to said second hydraulic unit, said first, second and third hydraulic units being situated in a closed hydraulic circuit, and a hydraulic motor in said hydraulic circuit, said motor being drivably connected to a load, said displacement varying means being sensitive to the rate of fluid discharged from said third hydraulic unit.

4. A hydrostatic transmission for delivering power from an engine to an engine driven load, a first hydraulic unit drivably connected to said engine, a second differential hydraulic unit comprising a pair of cooperating fluid pumping members, and a third hydraulic unit, one of said pumping members being mechanically connected to said first hydraulic unit and driven thereby, the other of said pumping members being mechanically connected to said third hydraulic unit, said first, second and third hydraulic units being situated in a closed hydraulic circuit, said hydraulic circuit including a fluid motor means for driving said load.

5. A hydrostatic transmission for delivering power from an engine to an engine driven load, a first hydraulic unit drivably connected to said engine, a second differential hydraulic unit comprising a pair of cooperating fluid pumping members, a third hydraulic unit, one of said pumping members being mechanically connected to said first hydraulic unit and driven thereby, the other of said pumping members being mechanically connected to said third hydraulic unit, said first, second and third hydraulic units being situated in a closed hydraulic circuit, said hydraulic circuit including a fluid motor means for driving said load, and means for varying the displacement of said first hydraulic unit, said displacement varying means being sensitive to the rate of flow of fluid through said third hydraulic unit.

6. A hydrostatic transmission for delivering power from an engine to a first and a second engine driven load, a first hydraulic unit drivably connected to said engine, a second differential hydraulic unit comprising a pair of cooperating fluid pumping members, a third hydraulic unit, one of said pumping members being mechanically connected to said first hydraulic unit and driven thereby, the other of said members being mechanically connected to said third hydraulic unit and to a first of said loads, a closed primary hydraulic circuit interconnecting said first and second hydraulic units whereby one unit functions as a motor and the other unit functions as a pump, and a secondary circuit connecting said third hydraulic unit to said first and second hydraulic units in parallel relationship, said second circuit including a fluid motor means for driving a second of said loads.

7. A hydrostatic transmission for delivering power from an engine to an engine driven load, a first variable displacement hydraulic unit drivably connected to said engine, a second differential hydraulic unit comprising a pair of cooperating fluid pumping members, a third hydraulic unit of fixed displacement, one of said pumping members being mechanically connected to said first hydraulic unit and driven thereby, the other of said pumping members being mechanically connected to said third hydraulic unit, a closed primary hydraulic circuit interconnecting said first and second hydraulic units whereby one unit functions as a motor and the other acts as a pump depending upon the relative speeds and displacements thereof, a secondary circuit connecting said hydraulic unit to said first and second hydraulic units in parallel relationship, said secondary circuit including a fluid motor means for driving said load, and means for automatically regulating the displacement of said first hydraulic unit in response to changes in the rate of flow of fluid through said third hydraulic unit.

8. A hydrostatic transmission for delivering power from an engine to a first and a second driven load, a first hydraulic unit drivably connected to said engine, means for varying the displacement of said first hydraulic unit, a second differential hydraulic unit comprising a pair of cooperating fluid pumping members, a third hydraulic unit, one of said pumping members being mechanically connected to said first hydraulic unit and driven thereby, the other of said pumping members being mechanically connected to said third hydraulic unit, a closed primary hydraulic circuit interconnecting said first and second hydraulic units whereby one unit functions as a motor and the other as a pump, a secondary circuit connecting said third hydraulic unit to said first and second hydraulic units in parallel relationship, means for transferring a pressure signal to said displacement varying means which is proportional in magnitude to the rate of discharge of fluid from said third hydraulic unit, said secondary circuit including a fluid motor means for driving one of said loads and means for mechanically connecting said third hydraulic unit to the other of said loads for powering the same.

9. A hydrostatic transmission comprising a first hydraulic unit, a second hydraulic unit, means for varying the displacement of said first hydraulic unit, a third hydraulic unit, said second and third hydraulic units being of fixed displacement, a source of driving power, said power source being mechanically connected to said first and second hydraulic units, said third hydraulic unit being mechanically connected to said second hydraulic unit, said first and second hydraulic units being disposed in a primary hydraulic circuit, said third hydraulic unit being disposed in and partly defining a secondary hydraulic circuit, and a hydraulic motor in said second hydraulic circuit, said motor being drivably connected to a load, said displacement varying means being sensitive to the rate of fluid discharged from said third hydraulic unit, said first and second hydraulic units each alternately acting as a pump and as a motor as the displacement of said first hydraulic unit is varied from a minimum to a maximum during operation, said third hydraulic unit alternately acting as a motor and as a pump when the magnitude of said load is progressively increased, the circuit pressure being intensified by said third hydraulic unit when the latter functions as a pump.

10. A hydrostatic transmission for delivering power from an engine to an engine driven load, a first hydraulic unit drivably connected to said engine, means for varying the displacement of said first hydraulic unit, a second differential hydraulic unit comprising a pair of cooperating fluid pumping members, said second hydraulic unit being of fixed displacement, a third fixed displacement hydraulic unit, one of said pumping members being mechanically connected to said first hydraulic unit and driven thereby, the other of said pumping members being mechanically connected to said third hydraulic unit, a closed primary hydraulic circuit interconnecting said first and second hydraulic units whereby one unit functions as a motor and the other acts as a pump, and a secondary circuit connecting said third hydraulic unit to said first and second hydraulic units in parallel relationship, said secondary circuit including a third motor means for driving said load, said displacement varying means being sensitive to the rate of flow of fluid through said secondary circuit, said first and second hydraulic units alternately acting as pumps and motors when the displacement of said first hydraulic unit is varied, said third hydraulic unit alternately acting as a motor and a pump when the magnitude of said load is varied, said third hydraulic unit being effective to intensify the circuit pressure when it functions as a pump.

11. A hydrostatic transmission for delivering power from an engine to an engine driven load, a first hydraulic unit drivably connected to said engine, a second differential hydraulic unit comprising a pair of cooperating pumping members, means for varying the displacement of said first hydraulic unit, a third fixed displacement hydraulic unit, one of said pumping members being mechanically connected to said first hydraulic unit and driven thereby, the other of said pumping members being mechanically connected to said third hydraulic unit, said first, second and third hydraulic units being situated within a closed hydraulic circuit, said displacement varying means being sensitive to the rate of fluid flow through said third hydraulic unit, said third hydraulic unit alternately acting as a motor and as a pump when the magnitude of said load is varied from a minimum to a maximum, said third hydraulic unit functioning to automatically intensify the circuit pressure when the transition of said third hydraulic unit from a motoring unit to a pumping unit is established.

12. In an accessory drive mechanism for a vehicle engine, a housing, a variable displacement hydraulic unit disposed in said housing, a differentially driven hydraulic unit within said housing, a third fixed displacement hydraulic unit within said housing, said first, second and third hydraulic units each having a pumping member in coaxial disposition, said second hydraulic unit including a second rotatable pumping member cooperating with a first pumping member thereof, a power input shaft connected to said first hydraulic unit and to said rotatable member in said hydraulic unit, a power output shaft mechanically connected to said third hydraulic unit and to the other of said pumping members of said second hydraulic unit, said first and second hydraulic units being disposed in and partly defining a common, closed primary hydraulic circuit whereby each of said units alternately functions as a pump and as a motor, said third hydraulic unit being disposed in and partly defining a second hydraulic circuit, a fluid motor means disposed in said second hydraulic circuit for powering a secondary load, and means for varying the displacement of said first hydraulic unit in response to the rate of fluid flow passing through said secondary hydraulic circuit.

13. In an accessory drive mechanism for a vehicle engine, a housing, a variable displacement hydraulic unit disposed in said housing, a differentially driven hydraulic unit within said housing, a third fixed displacement hydraulic unit within said housing, said first, second and third hydraulic units each having a pumping member in coaxial disposition, said second hydraulic unit including a second rotatable pumping member cooperating with the first pumping member thereof, a power input sleeve shaft connected to said first hydraulic unit and to said rotatable member of said second hydraulic unit, a power output shaft concentrically disposed within said sleeve shaft and mechanically connected to said third hydraulic unit and to the other of said pumping members of said second hydraulic unit, said power input shaft and said power output shaft extending outwardly from a common side of said housing to facilitate a driving connection with said engine and with a first load respectively, said first and second hydraulic units being disposed in and partly defining a common, closed primary hydraulic circuit whereby one unit functions as a pump and the other as a motor, said third hydraulic unit being disposed in and partly defining a secondary hydraulic circuit, a fluid motor means in said secondary hydraulic circuit for powering a secondary load, and means for varying the displacement of said first hydraulic unit in response to the rate of fluid flow passing through said secondary hydraulic circuit, said first and second hydraulic units alternately acting as pumps and as motors depending upon the relative speeds and displacements thereof.

14. In an accessory drive mechanism for a vehicle engine, a housing, a variable displacement hydraulic unit disposed in said housing, a differentially driven hydraulic unit within said housing, a third fixed displacement hydraulic unit within said housing, said first, second and third hydraulic units each having a pumping member in coaxial disposition, said second hydraulic unit including a second rotatable pumping member cooperating with the first pumping member thereof, a power input shaft connected to said first hydraulic unit and to said rotatable member of said second hydraulic unit, a power output shaft mechanically connected to said third hydraulic unit and to the other of said pumping members on said second hydraulic unit, said power output shaft being connected to a first load, said first and second hydraulic units being disposed in and partly defining a common, closed, primary hydraulic circuit whereby one unit functions as a pump and the other as a motor depending upon the relative speed and displacement thereof, said third hydraulic unit being disposed in and partly defining a secondary hydraulic circuit, a fluid motor means in said secondary hydraulic circuit for powering a secondary load, said secondary circuit being adapted to hydraulically connect said third hydraulic unit to said first and second hydraulic units in parallel relationship whereby said first and second hydraulic circuits form a continuous closed loop, and means for varying the displacement of said first hydraulic unit in response to the rate of fluid discharged from said third hydraulic unit, said third hydraulic unit alternately functioning as a motor and as a pump when the magnitude of said secondary load is increased from a minimum to a maximum.

15. In an accessory drive mechanism for a vehicle engine, a housing, a variable displacement hydraulic unit disposed in said housing, a differentially driven hydraulic unit within said housing, a third fixed displacement hydraulic unit within said housing, said first, second and third hydraulic units each having a pumping member in coaxial disposition, said second hydraulic unit including a second rotatable pumping member cooperating with the first pumping member thereof, a power input shaft connected to said first hydraulic unit and to said rotatable member of said second hydraulic unit, a power output shaft mechanically connected to said third hydraulic unit and to the other of said pumping members on said second hydraulic unit, said power output shaft being connected to a first load, said first and second hydraulic units being disposed in and partly defining a common, closed, primary hydraulic circuit whereby one unit functions as a pump and the other as a motor depending upon the relative speed and displacement thereof, said third hydraulic unit being disposed in and partly defining a secondary hydraulic circuit, a fluid motor means in said secondary hydraulic circuit for powering a secondary load, said secondary circuit being adapted to hydraulically connect said third hydraulic unit to said first and second hydraulic units in parallel relationship whereby said first and second hydraulic circuits form a continuous closed loop, and means for varying the displacement of said first hydraulic unit in response to the rate of fluid discharged from said third hydraulic unit, said third hydraulic unit alternately functioning as a motor and as a pump when the magnitude of said secondary load is increased from a minimum to a maximum, said input shaft and said power output shaft being situated in concentric relationship and extending from a common side of said housing to accommodate a driving connection with said engine and with said first load respectively.

No references cited.